United States Patent [19]

Bowdy et al.

[11] Patent Number: 4,681,285
[45] Date of Patent: Jul. 21, 1987

[54] NOSE WHEEL WATER SPRAY DEFLECTOR ENABLING WHEEL AND TIRE CHANGES WITHOUT DEFLECTOR REMOVAL

[75] Inventors: Fredrick E. Bowdy, Seattle; Rudi K. H. Glasenapp; Glen E. Ridgway, both of Bellevue, all of Wash.

[73] Assignee: The Boeing Company, Seattle, Wash.

[21] Appl. No.: 730,607

[22] Filed: May 6, 1985

Related U.S. Application Data

[63] Continuation of Ser. No. 499,623, May 31, 1983, abandoned.

[51] Int. Cl.⁴ .............................................. B64C 25/00
[52] U.S. Cl. ................................................. 244/103 R
[58] Field of Search ........................... 244/100–103, 244/105, 108, 130; 280/154.5, 150, 152, 156–159, 152.5, 160

[56] References Cited

U.S. PATENT DOCUMENTS

| | | | |
|---|---|---|---|
| 2,321,561 | 6/1943 | Bircher | 244/108 |
| 2,864,624 | 12/1958 | Lindelof et al. | 244/108 |
| 3,010,682 | 11/1961 | Moss et al. | 244/108 |
| 3,670,996 | 6/1972 | Jenny | 244/103 R |
| 4,389,029 | 6/1983 | Glasenapp et al. | 244/103 R |

Primary Examiner—Galen Barefoot
Attorney, Agent, or Firm—Conrad O. Gardner; B. A. Donahue

[57] ABSTRACT

A nose landing gear supported deflector for preventing ingestion of nose wheel side spray into wing-mounted engines. The deflector extends horizontally with respect to the runway surface and in front of the nose wheels while permitting landing gear and deflector retraction into the nose gear wheel well through the nose gear doorway. A four-point deflector attachment method permits nose wheel and tire changes without requiring removal of the entire deflector assembly.

2 Claims, 12 Drawing Figures

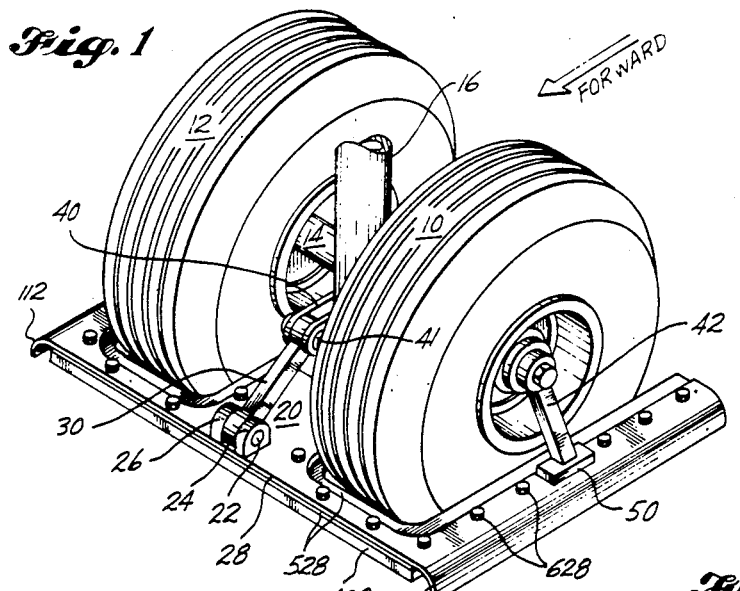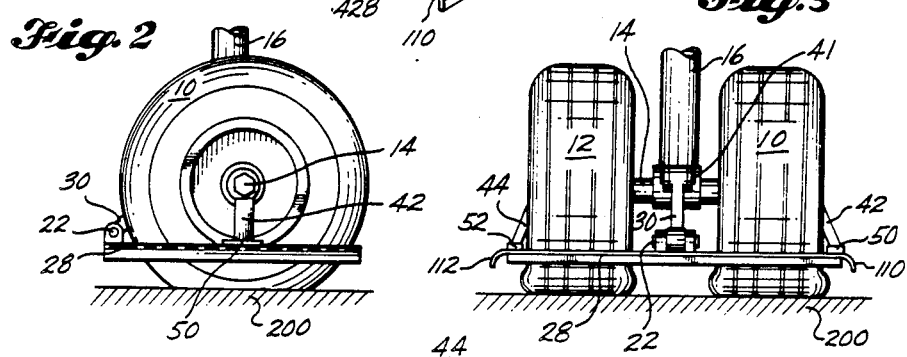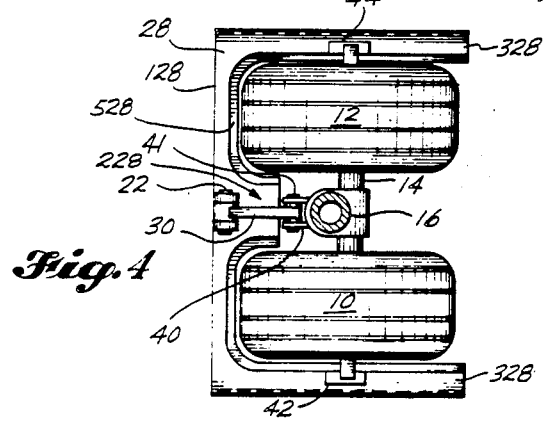

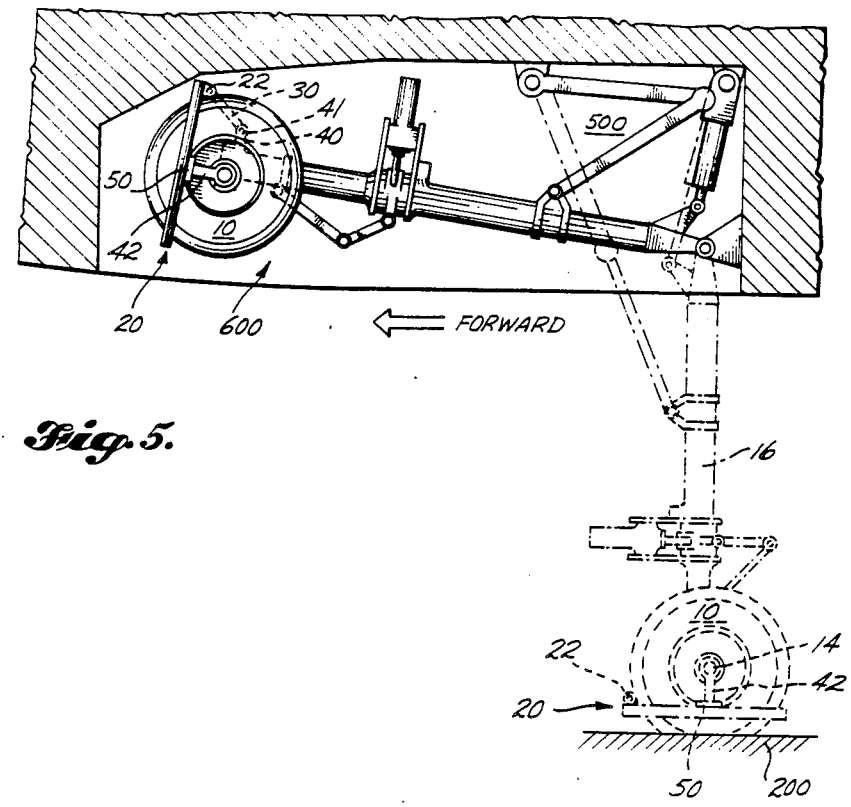

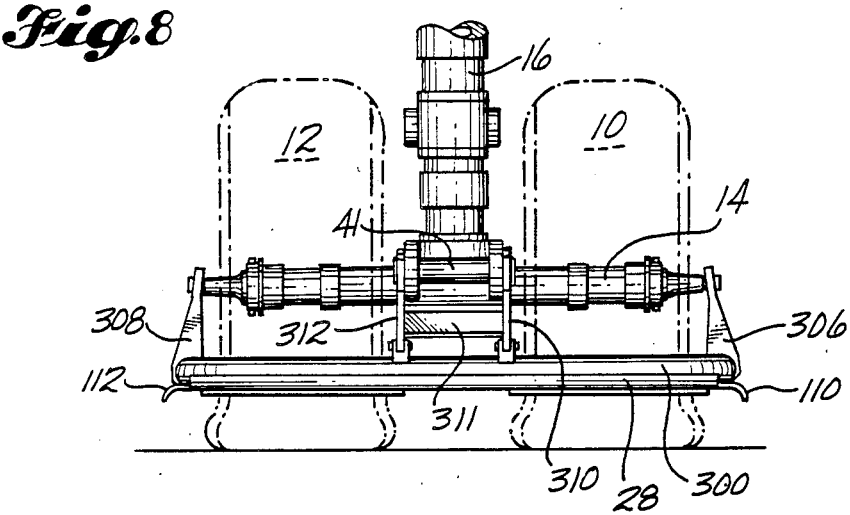
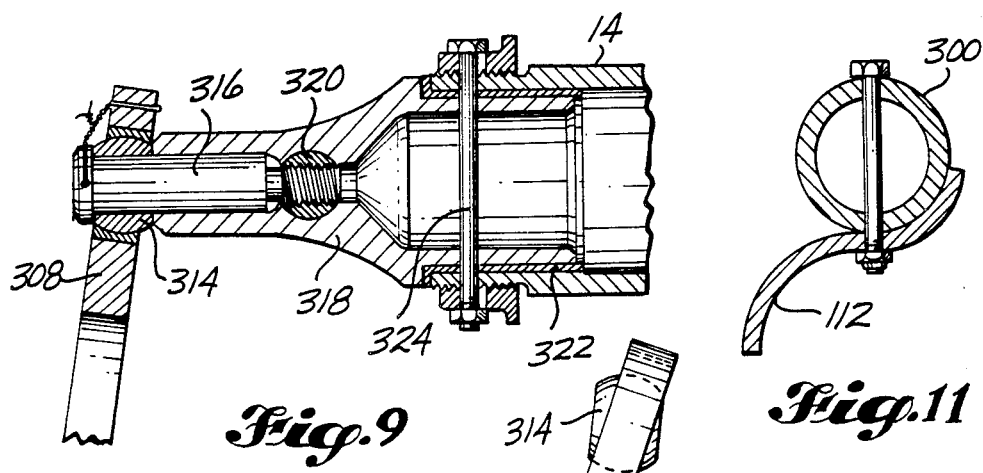
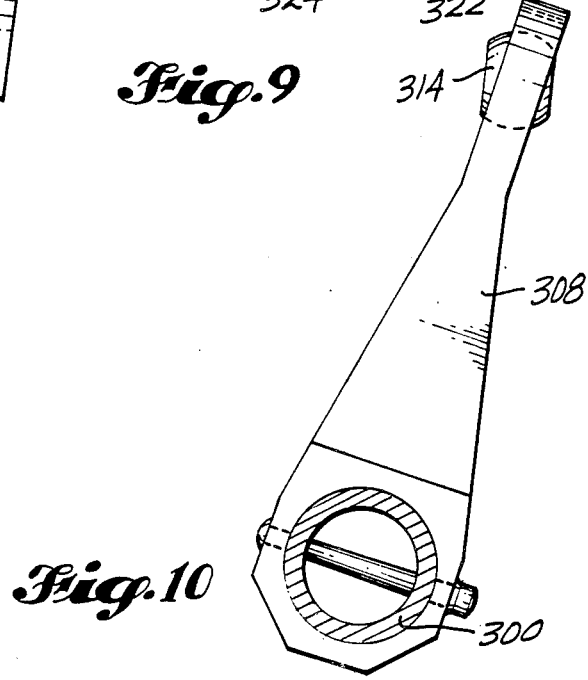

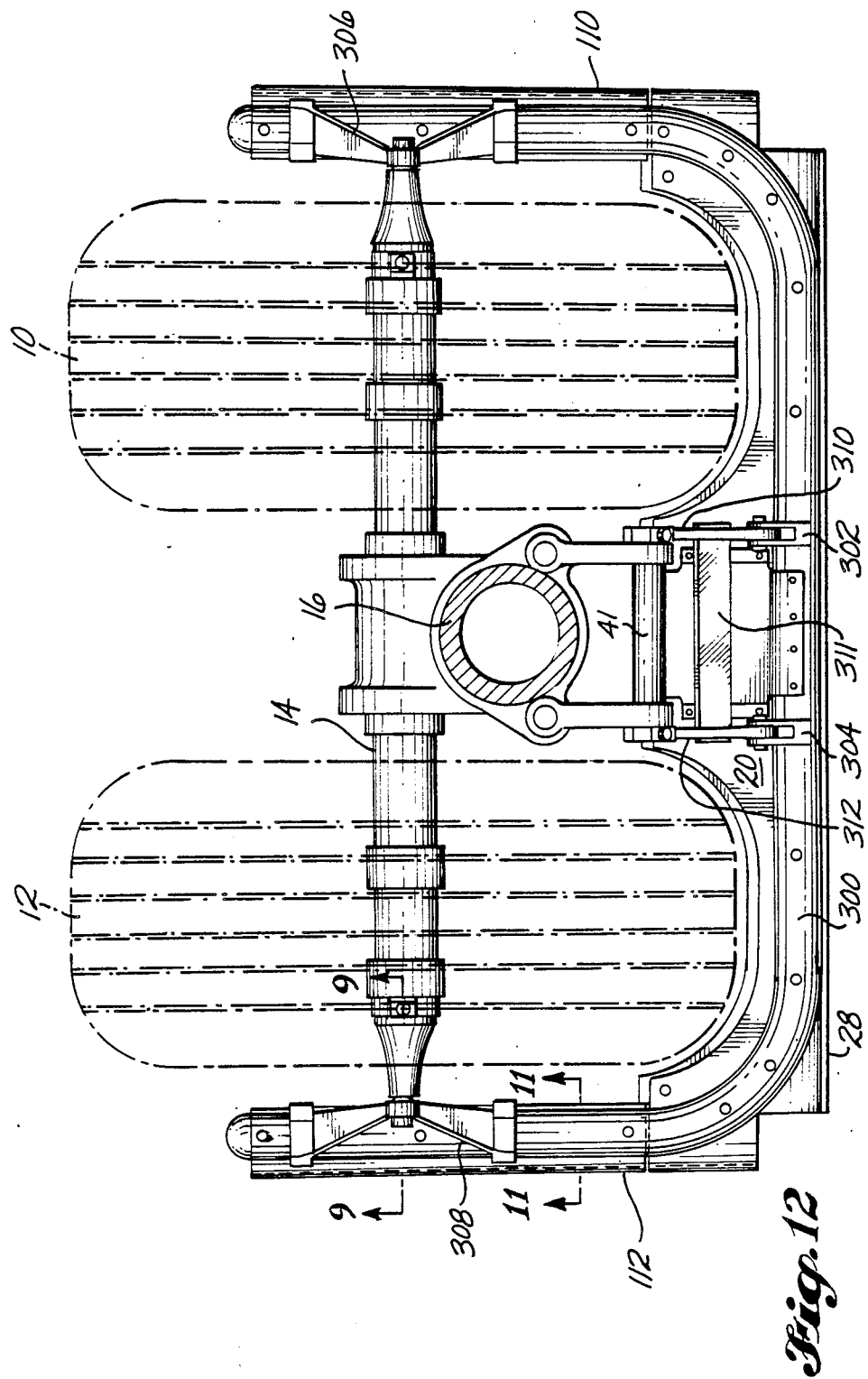

NOSE WHEEL WATER SPRAY DEFLECTOR ENABLING WHEEL AND TIRE CHANGES WITHOUT DEFLECTOR REMOVAL

This application is a continuation of U.S. application Ser. No. 499,623 filed May 31, 1983, now abandoned.

This invention relates to landing gear water spray deflectors and, more particularly, to a nose wheel water spray deflector improvement over co-pending U.S. patent application Ser. No. 315,763 filed Oct. 28, 1981, now U.S. Pat. No. 4,389,029, also assigned to The Boeing Company.

The prior deflector shown in aforereferenced U.S. patent application Ser. No. 315,763 is a landing gear mounted retractable structure which, when deployed horizontally in front of the nose wheels, prevents wing-mounted engine spray ingestion, the prior deflector plate utilizing a single front support member.

In contrast, the present deflector plate utilizes a U-shaped formed tube as the main stiffener for the deflector plate. Further, two support members are utilized between the front of the U-shaped tube and the tow fitting, thereby improving structural stiffness and further enabling wheel and tire changes.

It is, accordingly, an object of the present invention to provide deflector structure for restraining nose landing gear wheel generated side spray from ingestion by wing-mounted aircraft engines, the deflector structure utilizing a four-point attachment method, thereby allowing nose wheel and tire changes without requiring removal of the complete deflector assembly.

It is, yet, a further object of this invention to provide a nose wheel water spray deflector which is retractable with the nose gear through the wheel well doorway in which the nose wheel water spray deflector utilizes a U-shaped formed tube as a main stiffener for the deflector, the U-shaped tube extending along the front and left and right sides of the deflector so that the open side of the U is located aft.

A full understanding of the invention, and of its further objects and advantages and the several unique aspects thereof, will be had from the following description when taken in conjunction with the accompanying drawings in which:

FIG. 1 is a perspective view showing the prior nose wheel water spray deflector apparatus;

FIG. 2 is a side elevational view of the deflector apparatus shown in FIG. 1;

FIG. 3 is a front elevational view of the prior deflector apparatus shown in FIG. 1;

FIG. 4 is a top view of the prior deflector apparatus of FIG. 1, looking down from the aircraft fuselage with nose landing gear inner cylinder support for the nose wheel pair sectioned;

FIG. 5 is a side elevational view of the prior nose wheel water spray deflector apparatus of FIG. 1 shown in U.S. patent application Ser. No. 315,763 showing the nose gear in a solid line in stowed position and in dashed line for deployed position operation;

FIG. 8 is a front elevational view of the deflector apparatus of FIG. 6 which may be contrasted to the front elevational view of the prior deflector apparatus shown in FIG. 3;

FIG. 9 is an enlarged cross-sectional view of the upper attachment of the side fitting to the axle adapter, using a spherical bearing, a bolt, and a barrel nut. FIG. 9 also shows the fitment and connection of the axle adapter to the axle stub by means of a bushing and a crossbolt which extends through the axle nut, axle stub, bushing, and the adapter;

FIG. 10 is an enlarged section of the U-shaped support tube showing the lower side fitting attachment;

FIG. 11 is an enlarged section of the U-shaped support tube showing side deflector plate attachment; and, FIG. 12 is a top view of the deflector apparatus of the present invention which may be compared to the prior deflector apparatus of FIG. 1, this top view looking down from the aircraft fuselage with the nose landing gear inner cylinder support for the nose wheel pair sectioned.

Figure 6:
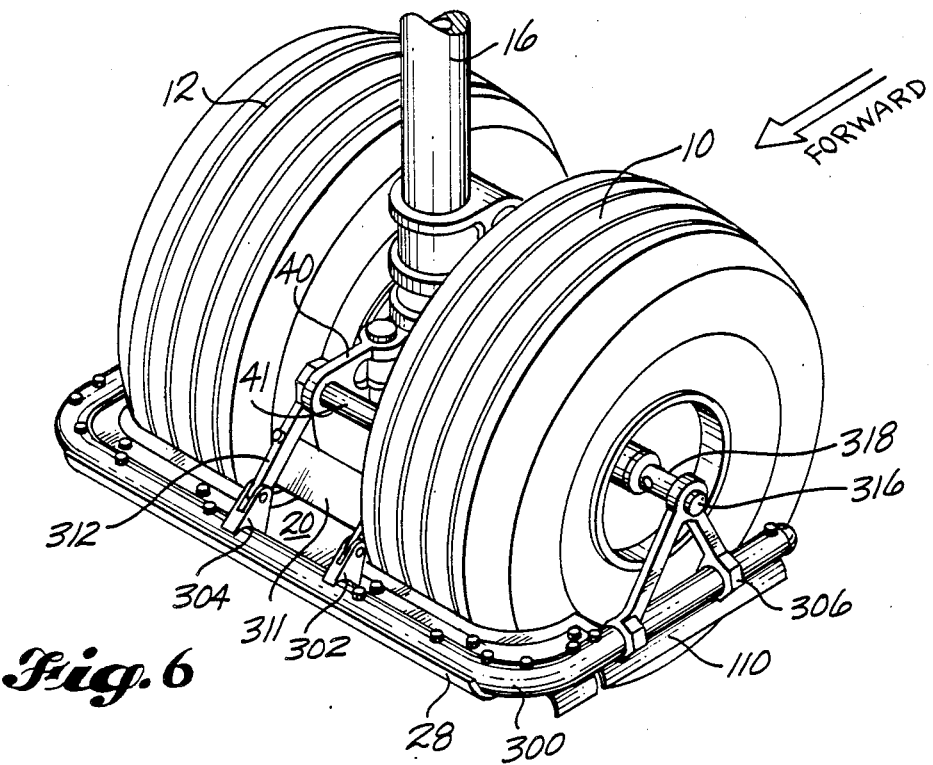
FIG. 6 is a perspective view showing the present nose wheel water spray deflector apparatus which may be contrasted to the prior nose wheel water spray deflector apparatus shown in similar perspective view in FIG. 1.

Turning now to FIG. 1, it will be seen that the nose landing gear inner cylinder 16 carries supportedly fixed thereto axle 14 supporting rotably mounted thereon in conventional manner a pair of nose gear wheels 10 and 12. The prior nose wheel water spray deflector apparatus 20 (shown in co-pending U.S. patent application Ser. No. 315,763) included a lateral support tube member 22 fixed on either end thereof by a pair of flanges 24 and 26, integral with horizontal deflector plate 28. Center support member 30 provided linkage to connect lateral support tube member 22 with nose gear tow fitting 40 via bolt connection 41. Side support members 42 and 44 (see in FIG. 3), one fixed as by bolting at one end to each side of horizontal deflector plate member 28 at points 50 and 52 (see FIG. 3), and with the other ends thereof disposed over axle 14 stubs.

The particular structural configuration of nose wheel water spray deflector apparatus 20 and important geometrical features thereof can be further understood when it is further noted that the leading edge (as observed from the indicated forward direction denoted in FIG. 4 by numeral 128) extends beyond the outer front surfaces of nose wheels 10 an 12. It can readily be seen from FIGS. 1 and 3 that the side edge portions 112 and 110 of the horizontal deflector plate member 28 are curved and directed downward toward runway surface 200 (as seen in FIG. 3). Besides noting that horizontal deflector plate member 28 extends sideways and ahead of nose wheels 10 and 12, it should be further noted that horizontal deflector plate member 28 extends (where nose landing gear is deployed in the extended condition as shown in FIG. 5 by dotted line representation) in a horizontal plane with respect to runway surface 200 and at a predetermined distance above runway surface 200, suspended with the bottom surface thereof about 9.1 inches below the center of axle 14. The inside dimension between side edge portions 112 and 110 of horizontal deflector plate member 28 is about 45.5 inches, and horizontal deflector plate member 28 has a central portion 228 (seen in FIG. 4) which extends aftwardly between nose wheels 10 and 12 a predetermined distance of about 8.0 inches, measured rearwardly from leading edge 128. Side leg portions 328 of horizontal deflector plate member 28 extend aft of leading edge 128 a distance of about 32.2 inches. As seen in FIG. 1, a flexible pad support member 428 is utilized below horizontal deflector plate member 28 to sandwich reinforced flexible pad member 528 therebetween in a secured condition as by fasteners 628.

As seen from top view in FIG. 4, flexible pad member 528 extends in a horizontal plane around the periphery of horizontal deflector plate member 28 along at least the front and sidewall surface portions of nose wheels 10 and 12, thereby reducing and minimizing the gap between horizontal deflector plate member 28 and the front and sidewall surface portions of nose wheels 10 and 12, the flexibility accommodating deflections and changes in shape and size of tires caused by use. The distance dimension of horizontal deflector plate member 28 from wheel centers provides sufficient ground clearance of member 28 in the event of a flat tire on the nose gear. FIG. 5 is deemed helpful in showing how the prior nose wheel water spray deflector apparatus 20 is hereinbefore described can be extended for deployment (as in the dotted line representation) or retracted by conventional nose wheel landing gear apparatus 500 into nose gear wheel well 600. The hereinafter described improved nose landing gear spray deflector of FIGS. 6-12 includes reference numerals utilized in the aforementioned prior art nose landing gear spray deflector to identify similar structure without repetitive detailed description thereof in the interest of brevity and clarity.

Turning now to the improved nose landing gear spray deflector shown in FIGS. 6-12, it can be seen from FIGS. 6, 11, and 12 that the forward and two side deflector plates (28 and 110/112, respectively) are riveted and bolted to a U-shaped support tube 300, located on the top side of the deflector assembly 20. Attached to the support tube 300 are two forward fittings 302 and 304 and two side fittings 306 and 308.

Figure 7:
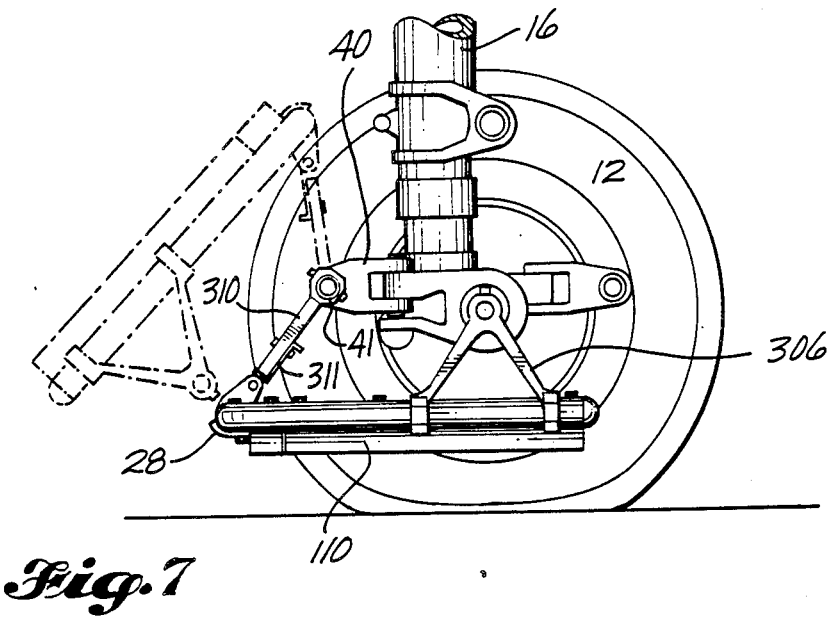
FIG. 7 is a side elevational view of the deflector apparatus of FIG. 6 shown in dotted line representation swung forward and up to provide room for wheel and tire changes, this side elevational view of the deflector apparatus being shown with one wheel removed.

As shown in FIGS. 6, 8, 12, the forked forward fittings 302 and 304 are attached to the forward portion of the support tube 300, symmetrically to the left and right of the deflector centerline. Each forward fitting accepts an adjustable forward link 310/312 which is fastened by a bolt and nut to the fork of the forward fitting. The other end of each forward link is fitted and bolted to the towing pin 41 of the nose gear tow fitting 40 (as best seen in FIGS. 7 and 12).

A lateral stiffening plate 311, connected to the left and right forward links 310 and 312, ties those links together for added rigidity.

As seen in FIGS. 8 and 10, side fittings 306/308 are attached to the legs of the U-shaped support tube 300. The upper end of each side fitting contains a spherical bearing 314, as seen in FIG. 9. A bolt 316 with an end thread extends through the bore of the spherical bearing 314 and ties each side fitting to an axle adapter 318 via a barrel nut 320 in the axle adapter's cross bore.

As seen in FIG. 9, the left and right axle adapters are mounted in the corresponding bore of the nose gear axle ends by means of a bushing 322 and the wheelnut cross bolt 324.

The chosen four-point deflector attachment method allows nose wheel and tire changes without requiring removal of the complete deflector asembly. By simply unscrewing and removing the two bolts 316 through the spherical bearings of the side fittings, the deflector assembly can swing forward and up, as seen in FIG. 7, to provide room for wheel and tire changes.

We claim:

1. In combination with the landing strut and axle supporting a pair of nose gear wheels of an aircraft, a nose wheel water spray deflector having a leading edge extending forward of said nose gear wheels and beyond the outer sidewall surface portions of said pair of nose gear wheels, said nose wheeel water spray deflector having aftwardly extending side leg portions and a central surface portion extending aftwardly between said pair of nose gear wheels, said aftwardly extending side leg portions having downturned side edge portions;

said deflector mounted by a U-shaped support tube attached to the deflector upper surface along the leading edge and left and right sides, said U-shaped support tube connected by two forward support members to the tow fitting of said nose landing gear and by a left and right support member on the side legs of the U-shaped support tube to the left and right wheel axle stubs, respectively;

characterized by a mounted flexible pad being mounted onto said deflector plate bottom and extending past said deflector plate in the direction of said wheels and tires to form a most possible close but controlled gap therebetween, accommodating tire flexibility; and, said left and right support members being connected to each axle by attachment means including the combination of a spherical bearing, a bolt through said bearing, a barrel nut, and an adapter, said two forward support members are pivotally connected to the tow fitting to provide pivoting of said deflector around the towing pin, further characterized by direct wheel/tire accessibility and wheel/tire removal after removal of only said bolts (316) and subsequently pivoting of said deflector about said tow pin, out of the way of the peripheral extent of the tires.

2. In combination in an aircraft having a plurality of wing-mounted engines and a nose landing gear having a pair of nose wheels, a nose wheel water spray deflector for preventing nose landing gear wheel generated side spray ingestion by said wing-mounted engines, said nose wheel water spray deflector having a leading edge extending foward of said pair of nose wheels, extending across the front of said nose wheels, and further extending in a plane parallel to the runway surface when the aircraft is in a landing configuration with nose wheels on the runway surface, said nose wheel water spray deflector attached to the inner cylinder of said nose landing gear and retractable through the nose wheel doorway during flight of the aircraft, said nose wheel spray deflector having a U-shaped support tube, mounted on the top side of the deflector plate along the leading edge of the deflector plate and further extending along the left and right sides of the deflector plate, the U-shaped support tube further connected through two front support members on the forward portion of the U-shaped support tube to the tow fitting of said nose gear and also connected through a left and right support member on the side legs of the U-shaped support tube to the left and right wheel axle stubs, respectively; and, said left and right support members being connected to each axle by attachment means including the combination of a spherical bearing, a bolt through said bearing, a barrel nut, and an adapter, said two forward support members are pivotally connected to the tow fitting to provide pivoting of said deflector around the towing pin, further characterized by direct wheel/tire accessibility and wheel/tire removal after removal of only said bolts (316) and subsequently pivoting of said deflector about said tow pin, out of the way of the peripheral extent of the tires.

* * * * *